US012662006B2

(12) United States Patent (10) Patent No.: US 12,662,006 B2
Vahle (45) Date of Patent: Jun. 23, 2026

(54) CHARGING SOCKET ARRANGEMENT FOR A VEHICLE

(71) Applicant: AUDI AG, Ingolstadt (DE)

(72) Inventor: Sebastian Vahle, Landshut (DE)

(73) Assignee: AUDI AG, Ingolstadt (DE)

( * ) Notice: Subject to any disclaimer, the term of this patent is extended or adjusted under 35 U.S.C. 154(b) by 323 days.

(21) Appl. No.: 18/580,345

(22) PCT Filed: Aug. 26, 2022

(86) PCT No.: PCT/EP2022/073837
§ 371 (c)(1),
(2) Date: Jan. 18, 2024

(87) PCT Pub. No.: WO2023/052013
PCT Pub. Date: Apr. 6, 2023

(65) Prior Publication Data
US 2024/0343134 A1 Oct. 17, 2024

(30) Foreign Application Priority Data

Sep. 28, 2021 (DE) ..................... 10 2021 125 153.2

(51) Int. Cl.
B60L 53/16 (2019.01)
H01R 13/447 (2006.01)
H01R 13/58 (2006.01)

(52) U.S. Cl.
CPC ........... B60L 53/16 (2019.02); H01R 13/447 (2013.01); H01R 13/5804 (2013.01); H01R 2201/26 (2013.01)

(58) Field of Classification Search
CPC .. B60L 53/16; B60L 2250/10; B60L 2250/16; H01R 13/447; H01R 13/5804;
(Continued)

(56) References Cited

U.S. PATENT DOCUMENTS 5,344,330 A * 9/1994 Hoffman ................. B60L 53/16
439/138
2013/0154402 A1 6/2013 Basavarajappa et al.
(Continued)

FOREIGN PATENT DOCUMENTS

CN 108068654 A 5/2018
CN 211859068 U 11/2020
(Continued)

OTHER PUBLICATIONS

Search Report and Written Opinion issued on Dec. 5, 2022 in corresponding International Application No. PCT/EP2022/073837; 25 pages.
(Continued)

*Primary Examiner* — Seung H Lee
(74) *Attorney, Agent, or Firm* — Maier & Maier, PLLC

(57) ABSTRACT
A charging socket arrangement for a vehicle, having a charging socket arranged in a charging socket recess and a charging socket flap, which covers the charging socket in a first position and exposes it in a second position, and a warning flap arranged in the area of the charging socket, which in a first position is invisible and can be covered by the charging socket flap and in a second position protrudes from an outer skin of the vehicle visibly in front of and/or behind the charging socket flap as a warning sign and warns other road users of a protruding charging cable, and a vehicle having such a charging socket arrangement.

20 Claims, 2 Drawing Sheets

(58) Field of Classification Search
CPC . H01R 2201/26; Y02T 10/7072; Y02T 10/70; Y02T 90/14
See application file for complete search history.

(56) References Cited

U.S. PATENT DOCUMENTS

| | | | |
|---|---|---|---|
| 2013/0196522 A1 | 8/2013 | Hara | |
| 2018/0135585 A1 | 5/2018 | Yagura et al. | |
| 2018/0215254 A1* | 8/2018 | Jobst | H01R 13/447 |

FOREIGN PATENT DOCUMENTS

| | | | |
|---|---|---|---|
| DE | 102011006481 A1 | 10/2012 | |
| DE | 102012009018 A1 | 11/2013 | |
| DE | 102017105966 A1 | 9/2017 | |
| DE | 102017222514 A1 | 6/2019 | |
| DE | 102020201574 A1 | 8/2021 | |
| FR | 2983652 A1 | 6/2013 | |
| GB | 2458754 A | 10/2009 | |
| WO | 2021070284 A1 | 4/2021 | |

OTHER PUBLICATIONS

Search Report issued on Aug. 17, 2022 in corresponding German application No. 10 2021 125 153.2; 8 pages.

Anonymous. "Car Review—BYD e6 Electric 80 kWh (A)" Aug. 1, 2019 (Aug. 1, 2019). pp. 1-4. Retrieved from the Internet: https://www.sgcarmart.com/news/review.php?AID=1509 &GASRC=sgcm [retrieved on Nov. 23, 2022] , 20 pages.

International Preliminary Report on Patentability issued on Dec. 8, 2023, in corresponding International Application No. PCT/EP2022/073837, 33 pages.

Anonymous, "BYD e6 is an electric crossover that's quirkier than a French car | Torque", retrieved from the Internet: URL: https://www.torque.com.sg/reviews/byd-e6-review/, Sep. 23, 2019, 10 pages.

* cited by examiner

CHARGING SOCKET ARRANGEMENT FOR A VEHICLE

FIELD

The invention relates to a charging socket arrangement for a vehicle. The invention further relates to a vehicle having such a charging socket arrangement.

BACKGROUND

Charging socket arrangements for vehicles having an electric drive are known in numerous variations. As a rule, the charging socket is located in a charging socket recess, which is arranged at different positions on the vehicle and can be covered by a charging socket flap. To charge a battery for the electric drive of the vehicle, the charging socket flap is opened and a charging plug of a charging cable is plugged into the charging socket. During the charging process, the plugged-in charging plug and the charging cable can protrude relatively far from the vehicle. Depending on the position of the charging socket on the vehicle, this can potentially endanger road users, in particular if the charging socket is on one side of the vehicle and the charging cable protrudes onto the road or a bicycle path.

A display device for an electric vehicle is known from DE 10 2011 006 481 A1, which signals or displays the state of charge of the battery of the electric vehicle by means of a lighting element or lighting means. The display device uses the lighting means to project the information about the state of charge of the battery, in particular into a windshield of the electric vehicle or onto the ground on which the electric vehicle is located, so that the projected information about the state of charge is visible from the outside.

A charging indicator for batteries of a vehicle having an electric drive is known from DE 10 2017 105 966 A1, which includes a display that is fastened on a cover of a charging connection and a controller. The display includes a first indicator connected to a first surface of the cover and a second indicator connected to a second surface of the cover. The controller, in reaction to an open cover after the vehicle is parked, illuminates the display such that the first and second indicators indicate the battery state of charge.

A method for electrically charging a motor vehicle is known from FR 2 983 652 A1, which comprises connecting an automobile to an electrical network using an electrical cable and positioning the electrical cable in a detection position. The electrical charging of the vehicle is started by conducting a charging current in the electrical cable. The presence of a electrical cable in the detection position is detected by a current sensor of the vehicle. Moreover, the temperature of the electric cable in the detection position is measured by a temperature sensor of the vehicle. The charging current is limited when the electrical cable is not detected in the detection position.

A charging socket arrangement of an electrically drivable motor vehicle having a charging socket, a turning socket flap, and a warning flap is known from each of US 2018/135585 A1, US 2013/196522 A1, and US 2013/154402 A1. The charging socket flap and the warning flap are attached via corresponding hinges to opposite sides of a charging socket recess.

A charging interface of an electrically driven or drivable motor vehicle is known from DE 10 2020 201 574 A1, which comprises a charging socket for a charging plug and a cover element for covering the charging socket and a charging flap, pivotable by an electric motor, for covering the charging socket and the cover element on a vehicle body of the motor vehicle. The cover element is movable by means of an electromagnet such that the charging socket can be exposed automatically or independently.

A charging socket system of an electrically drivable motor vehicle having a charging socket having at least one current connection and having at least one display device is known from DE 10 2017 222 514 A1, which outputs at least one optical signal during the charging process, which in particular represents information on the charging process.

A charging socket arrangement having a charging socket arranged in a charging socket recess and a charging socket flap, which covers the charging socket in a first position and exposes it in a second position, is known from each of CN 211 859 068 U and DE 10 2012 009 018 A1. An active lighting element is arranged in this case on the charging socket flap.

A charging socket arrangement for a vehicle, having a charging socket arranged in a charging socket recess and a charging socket flap, which covers the charging socket in a first position and exposes it in a second position, is known from each of GB 2 458 754 A and CN 108 068 654 A. The charging socket flap has a cable guide for guiding the charging cable connected to the charging socket on its back side facing toward the charging socket.

A charging socket arrangement for a vehicle having a charging socket arranged in a charging socket recess and a charging socket flap, which covers the charging socket in a first position and exposes it in a second position, and a warning flap arranged in the area of the charging socket, is known from WO 2021/070284 A1, which warning flap in a first position is invisible and can be covered by the charging socket flap and in a second position protrudes as a warning sign from an outer skin of the vehicle visibly in front of and/or behind the charging socket flap and warns other road users of a protruding charging cable. Information of a brightness sensor is evaluated in this case to actuate an active lighting element, wherein the active lighting element is activated when the brightness falls below a predetermined brightness threshold value.

A charging socket arrangement for a vehicle, having a charging socket arranged in a charging socket recess and a charging socket flap in the vehicle body color, which covers the charging socket in a first position and exposes it in a second position, and a warning flap arranged in the area of the charging socket, is known in each case from the document Anonymous: "Car Review—BYD e6 Electric 80 kWh (A)", 1 Aug. 2019, pages 1-4, XP093001460 with the document Anonymous: "Car Review—BYD e6 Electric 80 kWh (A) 1 Photo Gallery—Sgcarmart", 1 Aug. 2019, pages 1-2, XP093001461 and from the document Anonymous: "BYD e6 is an electric crossover that's quirkier than a French car Torque", 23 Sep. 2019, pages 1-14, XP093001471 which warning flap in a first position is invisible and can be covered by the charging socket flap and in a second position protrudes as a warning sign from an outer skin of the vehicle visibly in front of and/or behind the charging socket flap and warns other road users of a protruding charging cable.

SUMMARY

The invention is based on the object of providing a charging socket arrangement for a vehicle and a vehicle having such a charging socket arrangement, which warns other road users of the danger zone during a charging process.

In order to provide a charging socket arrangement for a vehicle which warns other road users of the danger zone during a charging process, a warning flap is arranged in the area of a charging socket, which in a first position is invisible and can be covered by a charging socket flap and in a second position visibly protrudes from the outer skin of the vehicle as a warning sign in front of and/or behind the charging socket flap and warns other road users of a protruding charging cable. The warning flap has, on its back side facing toward the charging socket, a cable guide for guiding the charging cable connected to the charging socket. In this case, the cable guide can be at least partially accommodated by a recess, which is introduced into the charging socket recess, in the first position of the warning flap. In the second position of the warning flap, the cable guide can protrude from the warning flap so that the charging cable can be introduced, preferably clipped into the cable guide. The plugged-in charging cable can thus advantageously not project excessively far from the vehicle. The charging cable can be protected from damage by the additional cable guide. Moreover, the additional cable guide can at least obstruct or prevent loosening of the plug connection between a plug of the charging cable and the charging socket.

The charging socket flap and the warning flap are attached via corresponding hinges to opposite sides of the charging socket recess. The protection of the charging cable and the plug connection between a plug of the charging cable and the charging socket can thus be further improved, since the charging socket flap protrudes on one side of the plug connection and the warning flap protrudes on the other side of the plug connection from the outer skin of the vehicle.

In addition, a vehicle having an electric drive and such a charging socket arrangement is proposed. The vehicle can be, for example, an electric vehicle having a solely electric drive or a hybrid vehicle which, in addition to the electric drive, has another drive, such as an internal combustion engine.

A charging socket arrangement for a vehicle is understood hereinafter to mean an arrangement having a charging socket arranged in a charging socket recess and a charging socket flap, which covers the charging socket in a first position and exposes it in a second position. In this case, the warning flap can also cover the charging socket in its first position and can preferably protrude perpendicularly, i.e., at an angle of 90°, from the outer skin of the vehicle in its second position.

The additional warning flap can make other road users aware of the potential danger caused by the plugged-in charging cable during a charging process. In addition, the charging cable or a plug connection between the charging cable and the charging socket can be protected by the additional warning flap.

In an advantageous embodiment of the charging socket arrangement, the warning flap can have a warning label. The warning label can, for example, have symbols and/or text in a clearly visible signal color in order to warn other road users of the danger zone. As symbols, for example, an identification or sticker having a multi-colored pattern, such as stripes in white and red or black and yellow, can be applied to the warning flap.

In a further advantageous embodiment of the charging socket arrangement, the warning flap can have an optical warning element. The optical warning element can be designed, for example, as a cost-effective passive reflector or as an active lighting element. The embodiment having a reflector or active light element can also implement a warning effect for other road users at night. In a particularly advantageous embodiment of the warning flap, information from a brightness sensor can be evaluated to actuate the active lighting element. This makes it possible to activate the active lighting element only when the brightness falls below a predetermined brightness threshold value. For this purpose, for example, a brightness sensor that is already present in the vehicle can be used. Alternatively, a brightness sensor can be arranged on the warning flap.

In a further advantageous embodiment of the charging socket arrangement, the cable guide can be designed to be movable and can fold out from a rest position to a working position when the warning flap is moved from the first position to the second position. This means that the recess can be omitted or made smaller.

In a further advantageous embodiment of the charging socket arrangement, the warning flap can be coupled to the charging socket flap in such a way that the warning flap moves from its first position to the second position when the charging socket flap is moved from the first position to the second position, and moves from its second position to the first position when the charging socket flap is moved from the second position to the first position. In a particularly advantageous embodiment, the charging socket flap and the warning flap can be coupled to one another via a linkage and/or a lever mechanism.

The features and combinations of features mentioned above in the description as well as the features and feature combinations mentioned below in the description of the figures and/or merely shown in the figures may be used not only in the combination specified, but also in other combinations or alone, without departing from the scope of the invention. The invention should therefore also be considered to comprise and disclose embodiments that are explicitly not shown or explained in the figures, but emerge and can be created from the explained embodiments by separate feature combinations.

BRIEF DESCRIPTION OF THE FIGURES

Exemplary embodiments of the invention are illustrated in the drawings and will be described in greater detail below. In the drawings, identical reference numerals designate components or elements that perform identical or analogous functions. In the figures.

DETAILED DESCRIPTION

Figure 1:
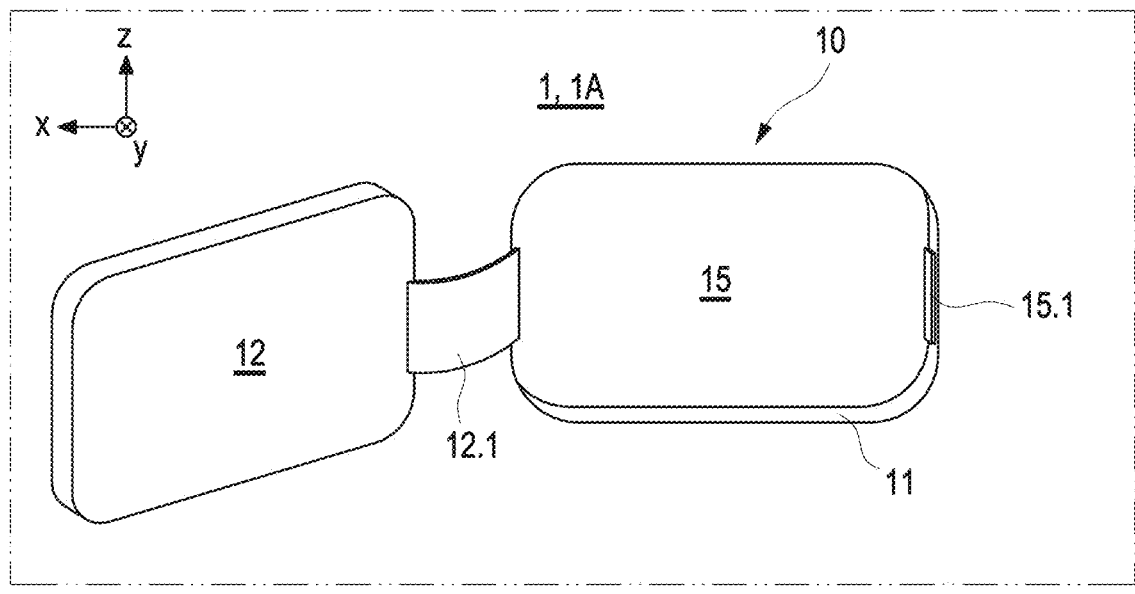
FIG. 1 shows a schematic and partial representation of a vehicle according to the invention in the area of a charging socket having an exemplary embodiment of a charging socket arrangement according to the invention in a first state.

As can be seen from FIGS. 1 to 4, the illustrated exemplary embodiment of a vehicle 1 has an electric drive and a charging socket arrangement 10 according to the invention, which in the illustrated exemplary embodiment is arranged on a left side of the vehicle.

As can furthermore be seen from FIGS. 1 to 4, the charging socket arrangement 10 according to the invention has a charging socket 13 arranged in a charging socket recess 11 and a charging socket flap 12, which covers the charging socket 13 in a first position and exposes it in a second position, and a warning flap 15 arranged in the area of the charging socket 13. In this case, in a first position the warning flap 15 is invisible and can be covered by the charging socket flap 12 and in a second position it protrudes visibly from an outer skin 1A of the vehicle 1 in front of and/or behind the charging socket flap 12 as a warning sign and warns others road users of a protruding charging cable 14.

In the first state of the charging socket arrangement 10 shown in FIG. 1, the charging socket flap 12 is opened from its first position into its second position and exposes the access to the charging recess. The warning flap 15 is in its non-visible first position and covers the charging socket 13.

Figure 2:
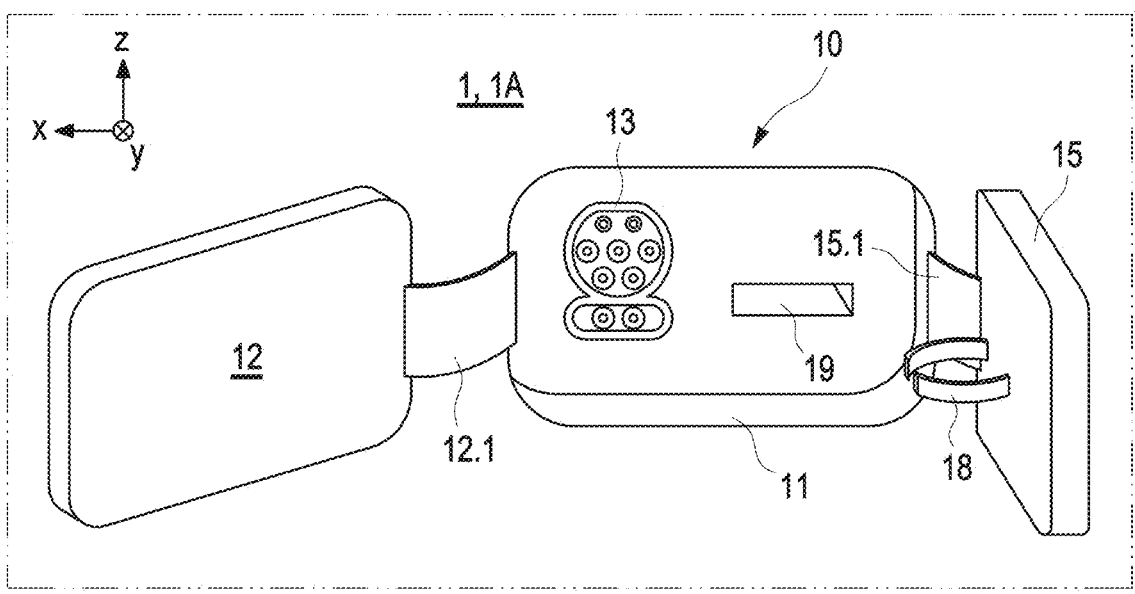
FIG. 2 shows a schematic and partial representation of the vehicle according to the invention in the area of the charging socket from FIG. 1 with the charging socket arrangement according to the invention in a second state.

In the second state of the charging socket arrangement 10 shown in FIG. 2, the warning flap 15 is opened into its second position, in which in the illustrated exemplary embodiment the warning flap 15 protrudes visibly as a warning sign from the outer skin 1A of the vehicle 1 in the longitudinal direction x in front of the charging socket flap 12.

In the illustrated exemplary embodiment of the charging socket arrangement 10, the charging socket flap 12 and the warning flap 15 are connected to opposite sides of the charging socket recess 11 via corresponding hinges 12.1, 15.1.

Figure 3:
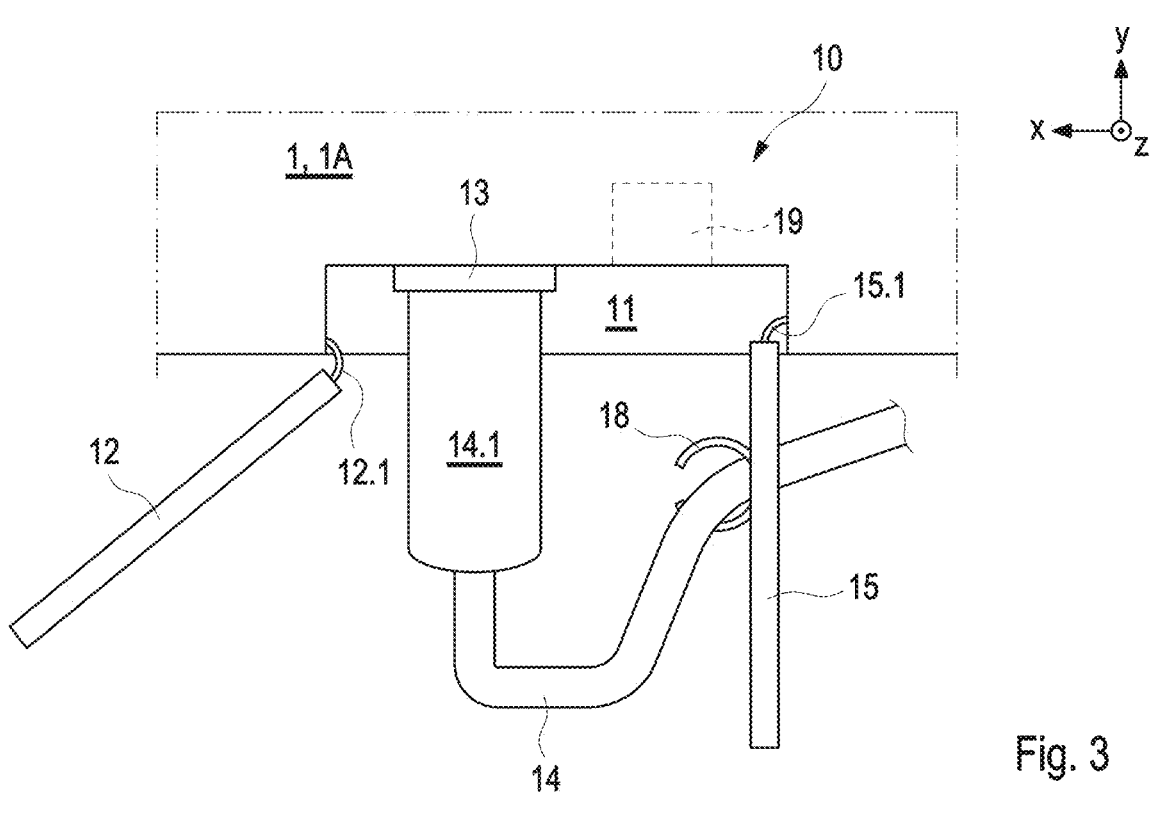
FIG. 3 shows a schematic and partial representation of the vehicle according to the invention in the area of the charging socket from FIG. 1 having the charging socket arrangement according to the invention in a fourth state.
Figure 4:
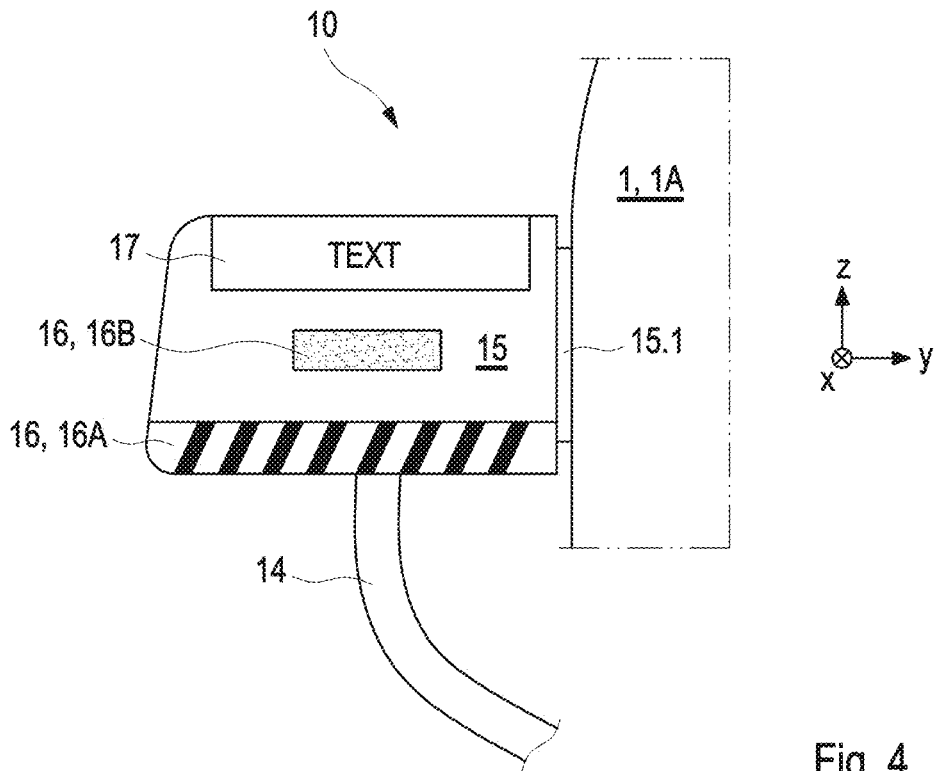
FIG. 4 shows a schematic and partial representation of the vehicle according to the invention in the area of the charging socket from FIG. 2 having the charging socket arrangement according to the invention in a fourth state.

In the third state of the charging socket arrangement 10 shown in FIGS. 3 and 4, a charging plug 14.1 of a charging cable 14 is also plugged into the charging socket 13.

As furthermore can be seen from FIG. 4, the warning flap 15 in the exemplary embodiment shown has a warning label 17 on a front side facing away from the charging socket 13, which in the exemplary embodiment shown is designed as a warning text "TEXT" in a visible signal color. For example, warning information such as "ATTENTION", "WARN-ING", etc. can be used as the warning label 17. In addition, the warning flap 15 has two optical warning elements 16 in the exemplary embodiment shown. In this case, a first optical warning element 16 is designed as a passive reflector 16A on a lower edge of the warning flap 15. A second optical warning element 16 is designed as an active lighting element 16B and is arranged approximately in the middle of the warning flap 15. To actuate the active lighting element 16B, information from a brightness sensor (not shown) present in the vehicle 1 is evaluated in the exemplary embodiment shown. Therefore, the active lighting element 16B is only activated when the brightness falls below a predetermined brightness threshold value.

As can furthermore be seen from FIGS. 2 and 3, the warning flap 15 has a cable guide 18 on its back side facing toward the charging socket 13 for guiding the charging cable 14 connected to the charging socket 13. In this case, in the first position of the warning flap 15, the cable guide 18 is at least partially accommodated by a recess 19, which is introduced into the charging socket recess 11. As can furthermore be seen from FIG. 3, the charging cable 14 is clipped into the cable guide 18 and is deflected downwards.

In an alternative exemplary embodiment, not shown, of the charging socket arrangement 10, the cable guide 18 is designed to be movable and folds out from a rest position to a working position when the warning flap 15 is moved from the first position to the second position.

In a further exemplary embodiment (not shown), the warning flap 15 is coupled to the charging socket flap 12 in such a way that the warning flap moves from its first position to the second position when the charging socket flap 12 is moved from the first position to the second position, and moves from its second position to the first position when the charging socket flap 12 is moved from the second position to the first position. In such an alternative exemplary embodiment, the warning flap 15 is coupled to the charging socket flap 12 via a linkage and/or a lever mechanism.

An additional warning flap 15 can be used to alert other road users of a potential danger zone. In addition, the charging cable 14 or the plug connection between the charging plug 14.1 of the charging cable 14 and the charging socket 13 is protected from damage or the plug connection being loosened by the additional warning flap 15 and the additional cable guide 18. In the version having reflector 16A or having active lighting element 16B, there is a warning effect for other road users even at night.

LIST OF REFERENCE NUMBERS

1 vehicle having electric drive
1A outer skin
10 charging socket arrangement
11 charging socket recess
12 charging socket flap
12.1 hinge
13 charging socket
14 charging cable
14.1 charging plug
15 warning flap
15.1 hinge
16 optical warning element
16A reflector
16B lighting element
17 warning label
18 cable guide
19 recess
x longitudinal direction
y transverse direction
z vertical direction

The invention claimed is:

1. A charging socket arrangement for a vehicle, comprising: a charging socket arranged in a charging socket recess and a charging socket flap, which covers the charging socket in a first position and exposes the charging socket arranged in the charging socket recess in a second position, and a warning flap arranged in the area of the charging socket, which, in a first position, is invisible and can be covered by the charging socket flap and, in a second position, protrudes from an outer skin of the vehicle visibly in front of and/or behind the charging socket flap as a warning sign and warns other road users of a protruding charging cable, wherein the warning flap has a cable guide on its back side facing toward the charging socket for guiding the charging cable connected to the charging socket, wherein the charging socket flap and the warning flap are connected to opposite sides of the charging socket recess (via corresponding hinges.

2. The charging socket arrangement according to claim 1, wherein the warning flap has a warning label.

3. The charging socket arrangement according to claim 2, wherein the warning flap has an optical warning element.

4. The charging socket arrangement according to claim 2, wherein in the first position of the warning flap, the cable guide is at least partially accommodated by a recess, which is introduced into the charging socket recess.

5. The charging socket arrangement according to claim 2, wherein the cable guide is designed to be movable and folds out from a rest position to a working position when the warning flap moves from the first position to the second position.

6. The charging socket arrangement according to claim 2, wherein the warning flap is coupled to the charging socket flap in such a way that the warning flap moves from its first position to the second position when the charging socket flap is moved from the first position to the second position, and moves from its second position to the first position when the charging socket flap is moved from the second position to the first position.

7. The charging socket arrangement according to claim 1, wherein the warning flap has an optical warning element.

8. The charging socket arrangement according to claim 7, wherein the optical warning element is designed as a passive reflector or as an active lighting element.

9. The charging socket arrangement according to claim 8, wherein information from a brightness sensor is evaluated to actuate the active lighting element, wherein the active lighting element is activated when the brightness falls below a predetermined brightness threshold value.

10. The charging socket arrangement according to claim 9, wherein in the first position of the warning flap, the cable guide is at least partially accommodated by a recess, which is introduced into the charging socket recess.

11. The charging socket arrangement according to claim 9, wherein the cable guide is designed to be movable and folds out from a rest position to a working position when the warning flap moves from the first position to the second position.

12. The charging socket arrangement according to claim 8, wherein in the first position of the warning flap, the cable guide is at least partially accommodated by a recess, which is introduced into the charging socket recess.

13. The charging socket arrangement according to claim 8, wherein the cable guide is designed to be movable and folds out from a rest position to a working position when the warning flap moves from the first position to the second position.

14. The charging socket arrangement according to claim 7, wherein in the first position of the warning flap, the cable guide is at least partially accommodated by a recess, which is introduced into the charging socket recess.

15. The charging socket arrangement according to claim 7, wherein the cable guide is designed to be movable and folds out from a rest position to a working position when the warning flap moves from the first position to the second position.

16. The charging socket arrangement according to claim 1, wherein in the first position of the warning flap, the cable guide is at least partially accommodated by a recess, which is introduced into the charging socket recess.

17. The charging socket arrangement according to claim 16, wherein the cable guide is designed to be movable and folds out from a rest position to a working position when the warning flap moves from the first position to the second position.

18. The charging socket arrangement according to claim 1, wherein the cable guide is designed to be movable and folds out from a rest position to a working position when the warning flap moves from the first position to the second position.

19. The charging socket arrangement according to claim 1, wherein the warning flap is coupled to the charging socket flap in such a way that the warning flap moves from its first position to the second position when the charging socket flap is moved from the first position to the second position, and moves from its second position to the first position when the charging socket flap is moved from the second position to the first position.

20. A vehicle having an electric drive and a charging socket arrangement, which is designed according to claim 12.

* * * * *